Oct. 14, 1958 CHIEN-BOR SUNG 2,855,857
REGULATOR FOR POSITIVE DISPLACEMENT FLUID MACHINES
Filed May 7, 1956 3 Sheets-Sheet 1

INVENTOR.
CHIEN-BOR SUNG
BY *Allen M. Kross*
AGENT

Oct. 14, 1958     CHIEN-BOR SUNG     2,855,857
REGULATOR FOR POSITIVE DISPLACEMENT FLUID MACHINES
Filed May 7, 1956     3 Sheets-Sheet 2

INVENTOR.
CHIEN-BOR SUNG
BY Allen M. Krass
AGENT

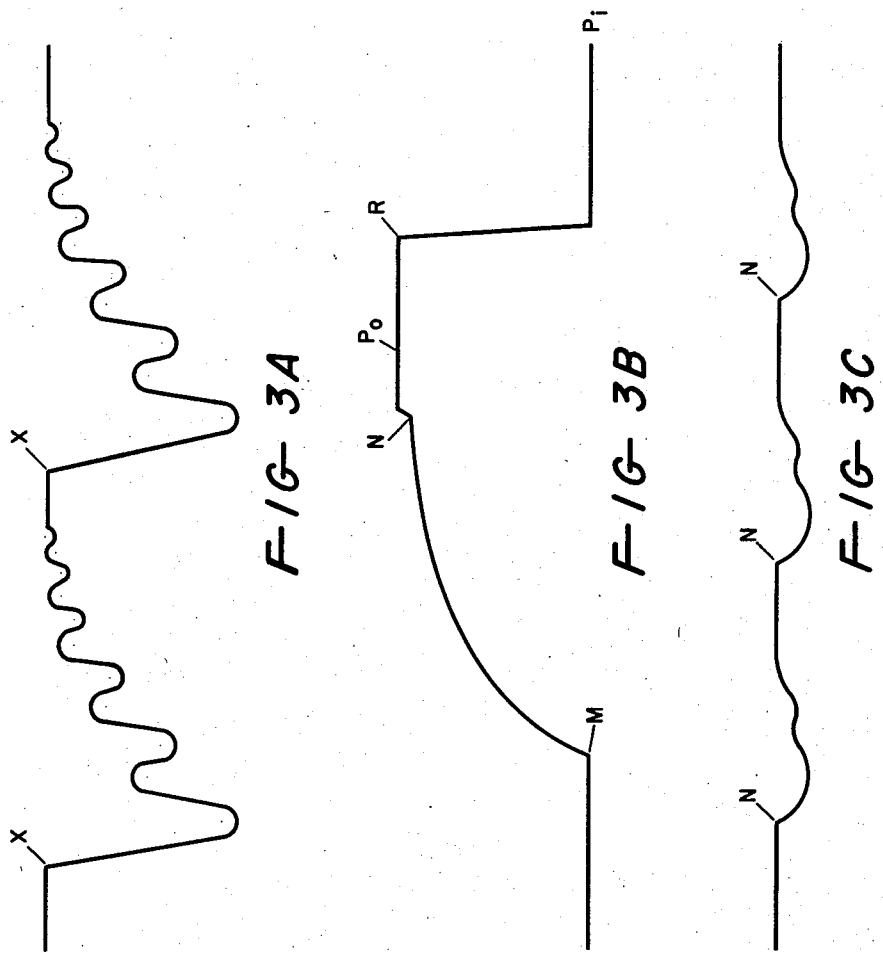

United States Patent Office 2,855,857
Patented Oct. 14, 1958

2,855,857

REGULATOR FOR POSITIVE DISPLACEMENT FLUID MACHINES

Chien-bor Sung, Oak Park, Mich., assignor to Bendix Aviation Corporation, Detroit, Mich., a corporation of Delaware Application May 7, 1956, Serial No. 583,158

8 Claims. (Cl. 103—136)

This invention relates to fluid power machines and more particularly to positive displacement machines having smooth outputs.

As hydraulic equipment finds increasing use in consumer applications, such as power equipment on automobiles, the noises generally associated with such equipment becomes a more serious problem. A large proportion of this undesirable noise occurs as a result of pulsations in the output of positive displacement pumps and motors which are used in many hydraulic systems.

Broadly, a positive displacement fluid machine constitutes an arrangement of members so connected and constructed that they define one or more isolated spaces or chambers that alternately increase and decrease in volume upon a relative movement of the members. While a chamber is increasing in volume it is connected to a fluid inlet port, while the volume is decreasing it is connected to a fluid outlet port and during transfer it is connected to neither.

If the machine is a motor, the inlet is at a high pressure relative to the outlet, and in a pump the reverse relation exists. Therefore, in a motor, because of the compressibility of the fluid, a pressure pulse occurs when a chamber which has been charged at the high pressure inlet pressure is first connected to the low pressure output. This pulse causes the motors in the output shaft to jerk. Likewise, in a positive displacement pump a pulse in the output line occurs when a chamber which has been filled with fluid at the low inlet pressure is connected to the high pressure outlet port.

Attempts have been made in the past to eliminate these surges by constructing positive displacement machines so as to promote leakage between the chambers and outlet ports before they are connected so as to minimize their pressure differential.

It is difficult to completely eliminate the pressure surge through an increase in leakage since leakage will also occur between the inlet port and the chamber and thus minimize the decompression effect and incidently reduce the pump's efficiency. In addition, this leakage out of the outlet ports is nonlinear because of both the variation in difference in pressure between the outlet and a chamber undergoing leakage precompression as the chamber becomes precompressed. This nonlinearity in leakage, of course, varies the output in an undesirable manner even though it does help the surge problem.

The present invention solves this surge problem by providing a reservoir of fluid at outlet pressure and means for connecting this reservoir to a chamber during the interval between its connection to an inlet port and its connection to an outlet port. The chamber is thus brought to almost outlet pressure and no appreciable surge occurs when it is connected directly to the outlet port.

This invention may be applied to all positive displacement machines in which the chambers are temporarily isolated from both the input and output. It eliminates the surge, and thus the surge produced noise, without appreciably diminishing the pump efficiency and through simple and inexpensive means.

In the preferred embodiment described, a passage is provided between the reservoir and the output circuit so that the invention may be operative over a wide speed range and independently of fluid temperature, viscosity and pump differential pressure.

It is, therefore, an object of this invention to provide positive displacement fluid power machines in which no pressure surge occurs when a chamber is first connected to an outlet port.

It is a further object to eliminate the pressure surge through use of a means that will not in itself affect the linearity of the output.

A further object of this invention is to provide a method of eliminating the pressure surge that will not also decrease the machine's efficiency.

A further object is to provide a reservoir of fluid at outlet pressure from which a chamber may be adjusted to outlet pressure before it is connected to an outlet port.

Another object is to provide means for adjusting the chamber pressure during the period in which the chamber is not connected to either the inlet or the outlet ports.

Other objects, applications and advantages of the invention will be made apparent by the following detailed description of an embodiment of the invention. That description refers to the accompanying drawings in which:

Figures 3A, 3B and 3C are respectively curves of the variation in outlet port pressure without accumulator action; variation in chamber pressure with accumulator action; and variation in outlet port pressure with accumulator action.

Figure 1:
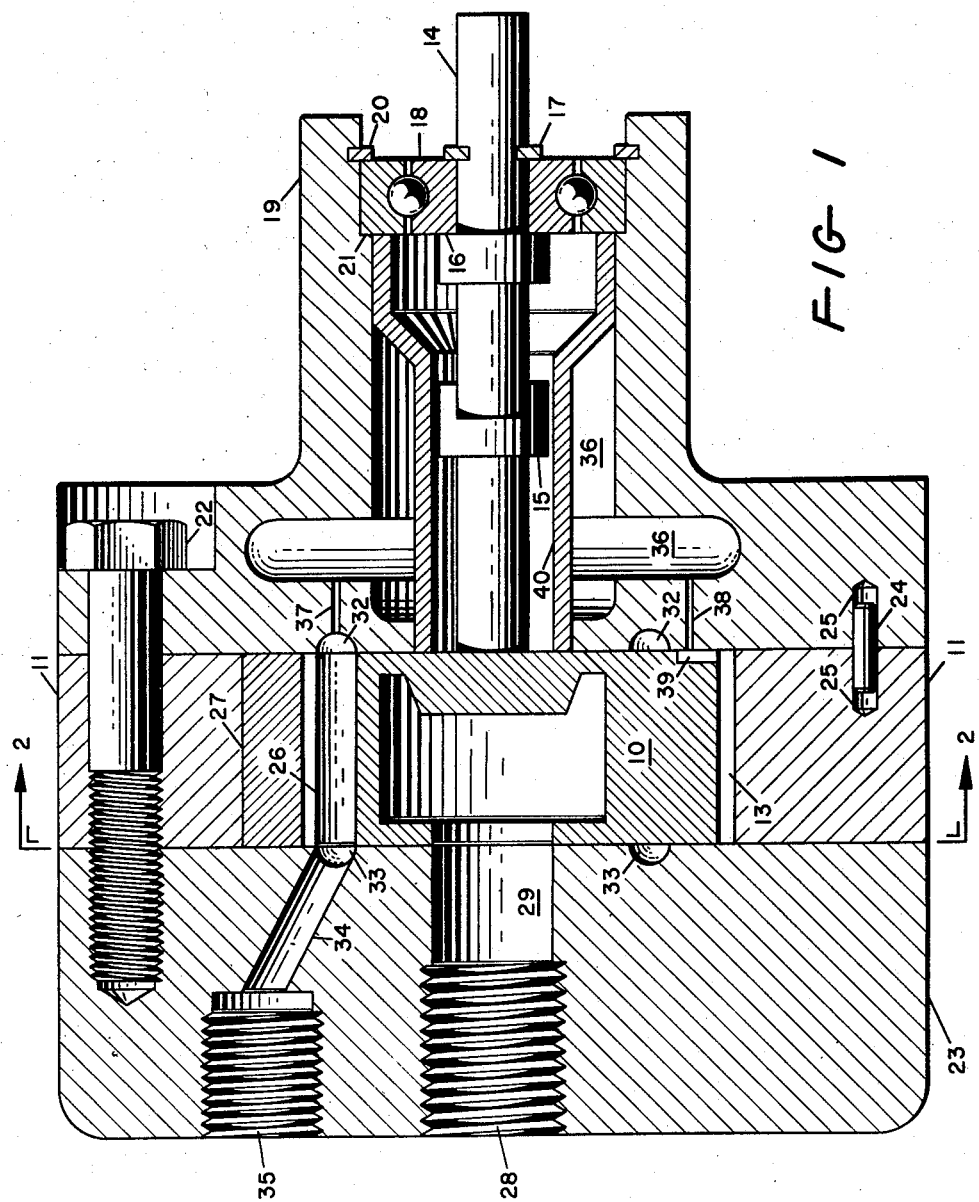
Figure 1 is a sectional view of a preferred embodiment of the pump taken along lines 1—1 of Figure 2.

In one embodiment of the invention a rotor 10 has a circular outer diameter while the inner diameter of an annular stator 11 varies in a regular radial pattern. This pattern is preferably a repeated curve taken from an equation which has continuous first and second derivatives. The reason for choosing a curve of this nature will subsequently appear. The particular curve chosen for this embodiment is repeated six times about the inner periphery of the stator 11. There are thus produced six points of minimum radius 12 at which a line of contact is made with the rotor 10. The areas between these lines of contact 12 are spaced from the rotor 10 so as to define six chambers 13.

The rotor 10 is powered through a shaft 14 that has a separable connection 15 that is necessary for assembly purposes. A shoulder 16 on the shaft 14 and a snap ring 17 retain an anti-friction bearing 18 that has its outer race positioned in an internal bore of a front end member 19 by a second snap ring 20 and a shoulder 21. A ring of bolts 22 pass through the front end member 19 and the stator 11 and secure them to a rear end member 23. Pin 24 fits in adjacent holes 25 in the stator 11 and front end member 19 and assures accurate alignment of the two.

Four radial slots 26 are spaced equidistant from one another about the periphery of the rotor 10. Vanes 27 are slidably positioned in each of the slots with their pointed ends outward. Centrifugal forces act upon the rotation of the rotor 10 to cause the vanes 27 to extend outwardly with their tips against the radially varying periphery of the stator 11. If the pump were to be used as a motor it would be necessary to provide springs below each of the vanes 27 to cause them to extend outwardly at the start of the rotational action.

As the rotor 10 is turned through the shaft 14, the vanes 27 ride up and down in their respective slots 26 as the radius of their contact point on the stator 11 changes. If the vanes 27 have end shapes such that they always contact the stator periphery at a single point, their motion will be the equivalent of the variation in the stator radius. The requirement that the stator curve be taken from an equation which has continuous first and second derivatives is necessary so that the vanes 27 will always remain in contact with the stator periphery at high rotor speeds.

Fluid is introduced into the pump through an inlet channel 28 in the rear end member 23. The channel is internally threaded to receive a standard fluid coupling. The channel 28 communicates with a central internal chamber 29 in the rotor 10. Four passages 30 connect the chamber 29 to positions on the rotor periphery adjacent to each of the vanes 27.

On the side of each vane opposite to the fluid inlet passages 30 a fluid outlet passage 31 extends parallel to the vanes 27 and communicates with annular grooves 32 and 33 that are cut in the front end member 19 and the rear end member 23 as is shown in Figure 1. The grooves 32 and 33 are always connected to one another through the four outlet passages 31 and thus form an outlet chamber. This chamber connects to the external circuitry through a passage 34 in the rear end member 23 and an internally threaded standard connector receptacle 35.

The pump as thus far described is in principle the equivalent of the pump described in co-pending application Serial No. 380,406, filed September 16, 1953, by John R. Farron and Chien-bor Sung. The contribution made to the art by the present invention has its embodiment in the provision of a relatively large central accumulator chamber 36 in the front end member 19, a passage 37 for communicating the chamber 36 to the outlet chamber groove 32 and a plurality of axial passages 38 in the front end member 19 for intermittently connecting the accumulator chamber 36 to the rotor-stator chambers 13 via radial passages 39 in the rotor 10. A tube 40 which surrounds the input shaft 14 defines the internal diameter of the chamber 36.

The operation of the pump will first be described as if the last mentioned elements (chamber 36, passages 37, 38 and 39) were not present so as to more clearly indicate the undesirable conditions of the prior art that the present invention remedies.

Figure 2:
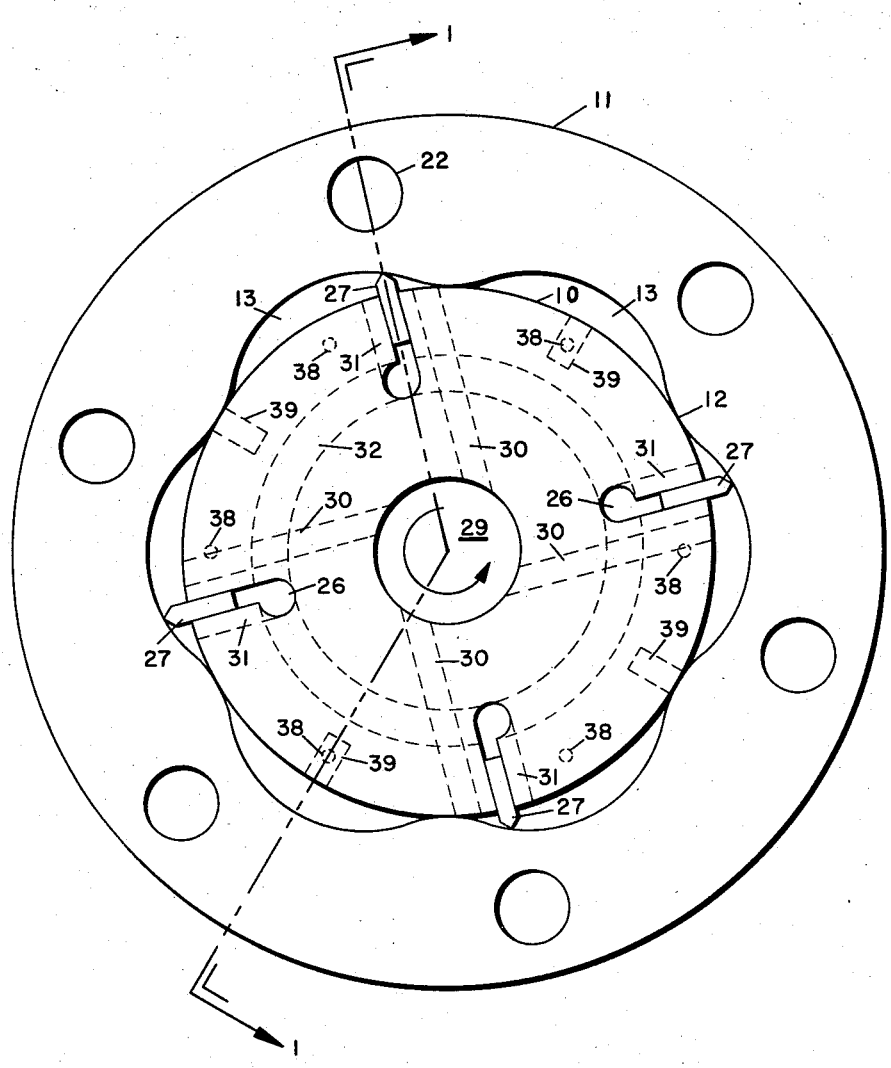
Figure 2 is a sectional view of the pump taken along lines 2—2 of Figure 1.

The rotor 10 is turned through the shaft 14 in the direction of the arrow in Figure 2 and a source of fluid is connected to the inlet channel 28.

As the speed of the rotor 10 reaches a point where the tips of the vanes 27 are extended against the contour of the stator 11 so as to form a seal, a partial vacuum will be formed in that part of the stator-rotor chamber 13 that is on the inlet port 30 side of each vane 27. Fluid will, therefore, be drawn into that part of the chamber 13 as it enlarges through the channel 28, the chamber 29 and the inlet ports 30. When a port 30 has progressed to the point where it is having its last contact with a particular chamber 13 that chamber will have become filled. After being filled a chamber is out of contact with either an inlet port 30 or an outlet port 31 for a portion of a revolution. A chamber next comes in contact with the following outlet port 31 and the adjacent vane 27 acts to cut off the chamber so as to force the fluid through the outlet port. The fluid flow through a given outlet port 31 at a given instant is proportional to the exposed length of the adjacent vane. The curve of the stator 11 is such that the sum of the flow from the various chambers 13 is a constant.

After the pump has reached operating speed the pressure in the outlet chamber defined by the recesses 32 and 33 builds up to its operating value. If leakage is ignored, the fluid in a chamber 13 is at inlet pressure when it is first exposed to an outlet port 31. With leakage considered, a chamber 13 is at some pressure greater than inlet and less than outlet when it is first exposed to an outlet port. In either event the sudden introduction of the high pressure output to the relatively low pressure chamber 13 causes a fluid surge into the chamber and a resultant lowering of the outlet port pressure. This surge is reflected at a decreased magnitude by the outlet circuit and causes a damped vibration in the output. Figure 3A illustrates the variation in a particular port pressure that results from this surge. Point X indicates the introduction of a chamber 13 to the particular outlet port 31 under study.

The present invention improves the output characteristic by eliminating the above surge. It does this by precompressing the fluid in the intermediate chambers 13 before the outlet ports are reached.

The pressure in the accumulator chamber 36 is maintained at substantially the output level by the passage 37 which connects it to the outlet groove 32. The chamber 36 has outlet through six axial passages 38 which are normally sealed off by the side of the rotor 10, but which feed into any of the radial grooves 39 when one of those grooves is at the same radial position as one of the passages 38.

The axial passages 38 and the radial grooves 39 are so positioned relative to one another that a particular groove 39 connects to one of the passages 38 just before that chamber 13 which is fed by the particular passage 39 is connected to an outlet port 31. They may, therefore, be seen to constitute a valving arrangement which has as its purpose to connect the accumulator chamber 36 to each of the chambers 13 just before the chamber so connected comes in contact with an outlet port 31. Other valving arrangements are to be understood as within the scope of the present invention. In order to achieve the correct timing in the present embodiment, the fixed axial passages 38 are positioned along radial lines through the points of maximum radius on the stator 11 curve and the radial grooves 39 are positioned slightly to the counter-rotational side of the midpoints between the vanes.

The passages 38 and grooves 39 are large enough so that the chamber 13 is precompressed by the outlet valve pressure in the accumulator chamber 36 in a very short time after its associated groove connects with a passage. On the other hand, the passage 37 which connects the accumulator chamber 36 to the output pressure is of such small diameter that the small percentage of decrease in the accumulator pressure when it charges a chamber 13 is not effectively communicated to the output. The diameter of passage 37 is sufficient to allow the accumulator 13 to be recharged from the output between valving periods.

The timing of valves 38, 39 must be such that a chamber 13 is precompressed at the last possible moment before the chamber is connected to an outlet port 31. This is so that leakage back to the inlet port 30 will not drain the precompression pressure out of the chamber.

Figure 3B shows the variation in chamber 13 pressure with accumulator action. At point M the accumulator precompression action begins and the pressure rises quickly in an exponential manner to almost the output pressure $P_o$. At point N the outlet port 31 is reached and the pressure rises to $P_o$. At point R the fluid is exhausted and the pressure returns to $P_1$, the input pressure.

Figure 3C shows the variation in output pressure with accumulator action. When a chamber is introduced in the output at point N the surge is much less than without precompression.

It is to be noted that the present precompression device may be applied to any positive displacement machine, not being limited to chamber and vane pumps or even to pumps but being equally applicable to piston and gear type pumps and motors.

It is also within the spirit of the present invention to provide an external source of pressure for the precompression reservoir.

The present invention thus may be seen to provide means for eliminating the pressure surge in all positive displacement machines in a simple, effective and economical manner.

Having thus described my invention, I claim:

1. In positive displacement hydraulic pumps and the like having a pump suction and discharge and one or more pumping chambers which alternately go through an expanding cycle and a contracting cycle, means for communicating said pumping chamber to said pump suction during its expanding cycle and for communicating said pumping chamber to said pump discharge during its contracting cycle, said pumping chamber having a period at the beginning of its contracting cycle when said pumping chamber is isolated from the suction and discharge of said pump: a reservoir for confining fluid of the type being pumped at an elevated pressure approaching the discharge pressure of said pump, said reservoir being separated in location from the discharge of said pump and being supplied with pressure fluid in a manner which does not produce appreciable pressure fluctuation in the discharge of said pump, and valve means for communicating said reservoir to said pumping chamber during the period when it is isolated from the suction and discharge of the pump for raising the pressure in said pumping chamber to approximately the pressure in said reservoir before said pumping chamber is communicated to the discharge of the pump, whereby the pressure in said pumping chamber is elevated to a pressure approaching the discharge pressure of said pump while it is isolated from the discharge of the pump so that substantially no pressure surge is created in the pump's discharge when the chamber is communicated to the discharge of the pump.

2. In positive displacement hydraulic pumps and the like having a pump suction and discharge and one or more pumping chambers which alternately go through an expanding cycle and a contracting cycle, means for communicating said pumping chamber to said pump suction during its expanding cycle and for communicating said pumping chamber to said pump discharge during its contracting cycle, said pumping chamber having a period at the beginning of its contracting cycle when said pumping chamber is isolated from the suction and discharge of said pump: a reservoir for confining some of the fluid being pumped at an elevated pressure approaching the discharge pressure of said pump, said reservoir being separated in location from the discharge of said pump, flow throttling means communicating the discharge of said pump to said reservoir, said throttling means being constructed and arranged to fill said reservoir in a manner which does not produce appreciable pressure fluctuation in the discharge of said pump, and valve means for communicating said reservoir to said pumping chamber during the period when it is isolated from the suction and discharge of the pump for raising the pressure in said pumping chamber to approximately the pressure in said reservoir before said pumping chamber is communicated by said first mentioned means to the discharge of the pump, whereby the pressure in said pumping chamber is elevated to a pressure approaching the discharge pressure of said pump while it is isolated from the discharge of the pump so that substantially no pressure surge is created in the pump's discharge when the chamber is communicated to the discharge of the pump.

3. In positive displacement hydraulic pumps and the like formed by a stationary member and a rotatable member having surfaces which are in sliding sealing engagement with each other and which members form one or more pumping chambers which alternately go through an expanding cycle and a contracting cycle to take fluid from a pump suction and force it out of a pump discharge: means for communicating said pumping chamber to said pump suction during its expanding cycle and for communicating said pumping chamber to said pump discharge during its contracting cycle, said pumping chamber having a period at the beginning of its contracting cycle when said pumping chamber is isolated from the suction and discharge of said pump, a reservoir for confining some of the fluid being pumped at an elevated pressure approaching the discharge pressure of said pump, said reservoir being separated in location from the discharge of said pump, flow throttling means communicating the discharge of said pump to said reservoir, said throttling means being constructed and arranged to fill said reservoir in a manner which does not produce appreciable pressure fluctuation in the discharge of said pump, and valve means driven by said rotatable member for communicating said reservoir to said pumping chamber during the period when it is isolated from the suction and discharge of the pump for raising the pressure in said pumping chamber to approximately the pressure in said reservoir before said pumping chamber is communicated by said said first mentioned means to the discharge of the pump, whereby the pressure in said pumping chamber is elevated to a pressure approaching the discharge pressure of said pump while it is isolated from the discharge of the pump so that substantially no pressure surge is created in the pump discharge when the chamber is communicated to the discharge of the pump.

4. In positive displacement hydraulic pumps and the like formed by a stationary member and a rotatable member having surfaces which are in sliding sealing engagement with each other and which members form one or more pumping chambers which alternately go through an expanding cycle and a contracting cycle to take fluid from a pump suction and force it out of a pump discharge: means for communicating said pumping chamber to said pump suction during its expanding cycle and for communicating said pumping chamber to said pump discharge during its contracting cycle, said pumping chamber having a period at the beginning of its contracting cycle when said pumping chamber is isolated from the suction and discharge of said pump, a reservoir for confining some of the fluid being pumped at an elevated pressure approaching the discharge pressure of said pump, said reservoir being separated in location from the discharge of said pump, flow throttling means communicating the discharge of said pump to said reservoir, said throttling means being constructed and arranged to fill said reservoir in a manner which does not produce appreciable pressure fluctuation in the discharge of said pump, and valve means mounted in said sliding sealing surfaces for communicating said reservoir to said pumping chamber during the period when it is isolated from the suction and discharge of the pump for raising the pressure in said pumping chamber to approximately the pressure in said reservoir before said pumping chamber is communicated by said first mentioned means to the discharge of the pump, whereby the pressure in said pumping chamber is elevated to a pressure approaching the discharge pressure of said pump while it is isolated from the discharge of the pump so that substantially no pressure surge is created in the pump discharge when the chamber is communicated to the discharge of the pump.

5. In positive displacement hydraulic pumps and the like having a stationary casing member and a rotary member, said members having generally radially extending side surfaces which are in sliding sealing engagement with each other and which members form at least one variable volume pumping chamber between the periphery of said rotary member and said casing member, said members being constructed and arranged to cause said pumping chamber to alternately expand and contract during rotation of said rotary member, and said stationary member having an inlet passage system for supplying fluid to the pump, having a discharge passage system for the pump, and having a pressure reservoir generally isolated from said inlet and discharge passage system for confining fluid of the type being pumped at an elevated pressure approaching the discharge pressure of the pump: means for communicating said inlet passage system to said pumping chamber when it is expanding, for communicating said discharge passage system when it is contracting, and for isolating said pumping chamber from both the inlet and outlet systems for a period prior to being connected to said discharge system, means for filling said reservoir in a manner which does not produce appreciable pressure fluctuation in said discharge system; and valve means located in said sliding sealing side surfaces of the casing and rotary members for communicating said reservoir to said pumping chamber during the period when it is isolated from the suction and discharge of the pump for raising the pressure in said pumping chamber to a pressure approaching pump discharge pressure immediately before said pumping chamber is communicated with said discharge system, whereby substantially no pressure surging is created in said discharge system when said pumping chamber is communicated therewith.

6. In positive displacement hydraulic pumps and the like having a stationary casing member and a rotary member, said members having generally radially extending side surfaces which are in sliding sealing engagement with each other and which members form at least one variable volume pumping chamber between the periphery of said rotary member and said casing member, said members being constructed and arranged to cause said pumping chamber to alternately expand and contract during rotation of said rotary member, and said stationary member having an inlet passage system for supplying fluid to the pump, having a discharge passage system for the pump, and having a pressure reservoir generally isolated from said inlet and discharge passage system for confining fluid of the type being pumped at an elevated pressure approaching the discharge pressure of the pump: means for communicating said inlet passage system to said pumping chamber when it is expanding, for communicating said discharge passage system when it is contracting, and for isolating said pumping chamber from both the inlet and outlet systems for a period prior to being connected to said discharge system, flow throttling means for filling said reservoir with fluid from said discharge system in a manner which does not produce appreciable pressure fluctuation in said discharge system; first port means in said side surfaces of said stationary member communicating with said reservoir, and second port means in the cooperating side surfaces of said rotor communicating with said pumping chamber, said first and second port means being positioned and arranged to register with each other at a time when said pumping chamber is isolated from said suction and discharge systems and thereby raise the pressure in said pumping chamber to a pressure approaching pump discharge pressure immediately before said pumping chamber is communicated with said discharge system, the flow capacity of said flow throttling means being appreciably less than that of said ports, whereby substantially no pressure surging is created in said discharge system when said pumping chamber is communicated therewith.

7. In positive displacement hydraulic pumps and the like having a stationary casing member and a rotary member, said members having generally radially extending side surfaces which are in sliding sealing engagement with each other and which members form at least one variable volume pumping chamber between the periphery of said rotary member and said casing member, said members being constructed and arranged to cause said pumping chamber to alternately expand and contract during rotation of said rotary member, and said stationary member having an inlet passage system for supplying fluid to the pump, having a discharge passage system for the pump, and having a pressure reservoir generally isolated from said inlet and discharge passage systems: means for communicating said inlet passage system to said pumping chamber when it is expanding, for communicating said discharge passage system when it is contracting, and for isolating said pumping chamber from both the inlet and outlet systems for a period prior to being connected to said discharge system, flow throttling means communicating said discharge system to said reservoir, said throttling means being constructed and arranged to fill said reservoir in a manner which does not produce appreciable pressure fluctuation in said discharge system; first port means in said side surfaces of said stationary member communicating with said reservoir, and second port means in the cooperating side surfaces of said rotor communicating with said pumping chamber, said first and second port means being positioned and arranged to register with each other at a time when said pumping chamber is isolated from said suction and discharge systems and thereby raise the pressure in said pumping chamber to a pressure approaching pump discharge pressure immediately before said pumping chamber is communicated with said discharge system, the flow capacity of said flow throttling means being appreciably less than that of said ports, whereby substantially no pressure surging is created in said discharge system when said pumping chamber is communicated therewith.

8. In positive displacement hydraulic pumps and the like: a stationary casing member having an internal chamber formed by generally axially extending peripheral surfaces and generally radially extending side surfaces, a rotor in said chamber having generally axially extending outer peripheral surfaces and generally radially extending side surfaces, said side surfaces of said rotor being in sliding sealing engagement with the side surfaces of said internal chamber, a plurality of generally radially extending vanes in said chamber, said vanes being in sliding sealing engagement with the side surfaces of said internal chamber and being slidably mounted in one of said members for sliding sealing engagement with the peripheral surface of the other of said members to form a plurality of isolated pumping compartments which alternately expand and contract during rotation of said rotary member, said stationary member having an inlet passage system for supplying fluid to the pump, having a discharge passage system for the pump, and having a pressure reservoir generally isolated from said inlet and discharge passage systems, means for communicating said inlet passage system to one of said pumping compartments when it is expanding, for communicating said discharge passage system when it is contracting, and for isolating said pumping compartment from both the inlet and outlet systems for a period prior to being connected to said discharge system; flow throttling means communicating said discharge system to said reservoir, said throttling means being constructed and arranged to fill said reservoir in a manner which does not produce appreciable pressure fluctuation in said discharge system; first port means in said side surfaces of said stationary member communicating with said reservoir, and second port means formed by a generally radially extending depression in the side surface of said rotor communicating with said pumping compartment between said vanes, said first and second port means being positioned and arranged to register with each other at a time when said pumping chamber is isolated from said suction and discharge systems and thereby raise the pressure in said pumping compartment to a pressure approaching pump discharge pressure immediately before said pumping compartment is communicated with said discharge system, the flow capacity of said flow throttling means being appreciably less than that of said ports, whereby substantially no pressure surging is created in said discharge system when said pumping compartment is communicated therewith.

(References on following page)

References Cited in the file of this patent

UNITED STATES PATENTS

| | | |
|---|---|---|
| 2,035,465 | Erskine et al. | Mar. 31, 1936 |
| 2,255,785 | Kendrick | Sept. 16, 1941 |
| 2,387,761 | Kendrick | Oct. 30, 1945 |
| 2,632,398 | Ferris | Mar. 24, 1953 |
| 2,720,171 | Harrington et al. | Oct. 11, 1955 |

FOREIGN PATENTS

| | | |
|---|---|---|
| 433,488 | Great Britain | Aug. 15, 1935 |
| 501,006 | Belgium | Feb. 28, 1915 |